Aug. 7, 1945.　　　　G. B. WATKINS　　　　2,381,194

MULTIPLE GLAZING UNIT AND MOUNTING THEREFOR

Filed Oct. 4, 1941　　　2 Sheets-Sheet 1

Inventor
GEORGE B. WATKINS.

By Frank Fraser
Attorney

Aug. 7, 1945.  G. B. WATKINS  2,381,194
MULTIPLE GLAZING UNIT AND MOUNTING THEREFOR
Filed Oct. 4, 1941  2 Sheets-Sheet 2

Inventor
GEORGE B. WATKINS.
By Frank Fraser
Attorney

Patented Aug. 7, 1945

2,381,194

UNITED STATES PATENT OFFICE 2,381,194

MULTIPLE GLAZING UNIT AND MOUNTING THEREFOR

George B. Watkins, Toledo, Ohio, assignor to Libbey-Owens-Ford Glass Company, Toledo, Ohio, a corporation of Ohio Application October 4, 1941, Serial No. 413,622

8 Claims. (Cl. 20—56.5)

The present invention relates to a multiple glazing unit and to the mounting thereof.

Although the glazing unit of this invention is not restricted to any particular use, it has been primarily designed for and is of utility in glazing openings in airplanes and other aircraft where the requirements are unusually stringent.

Generally stated, the type of glazing construction comprehended by the invention comprises two transparent panels arranged in face to face relation and spaced from one another by separator means arranged entirely around the edges thereof to provide an insulating space therebetween. At least one of the transparent panels consists of a sheet of laminated safety glass comprising two sheets of glass having an interposed layer of thermoplastic adherent thereto. The other panel may also consist of a sheet of laminated safety glass or it may be formed of a single sheet of glass or a sheet of relatively hard transparent plastic.

An object of the invention is to provide an improved multiple glazing unit of the above type having means for mounting the same of such character as to afford a certain resiliency or freedom of movement of the unit relative to the supporting frame in or upon which it is mounted whereby torsion and shock to which the airplane may be subjected will be "cushioned" and for all practical purposes will not be transmitted directly to the glass, or other transparent panels, thus reducing or eliminating the tendency of cracking or shattering thereof from such cause.

Another object of the invention is the provision of a multiple glazing unit of the above type having a flexible yet substantial mounting therefor including a flexible or yielding metal supporting member permanently carried by the transparent panels and extending beyond the edge thereof to provide an attaching flange by which the glazing unit may be initially mounted with relative ease in or upon the supporting frame, and with the further advantage that when the plane is in flight and twists, weaves or is subjected to varying pressure differentials the glass or other transparent panels will not tend to break because of its ability to "float" without introduction of localized strains.

A further object of the invention is the provision of a multiple glazing unit of the above character in which the flexible metal attaching flange is arranged inwardly of the outer faces of the transparent panels so that when the structure is mounted in a supporting frame or upon a support the outer face of the structure can be made flush with the outer surface of said frame or support and thus not interfere with streamlined surfaces or tend to increase wind resistance.

Other objects and advantages of the invention will become more apparent during the course of the following description, when taken in connection with the accompanying drawings.

In the drawings, wherein like numerals are employed to designate like parts throughout the same:

Figure 1:
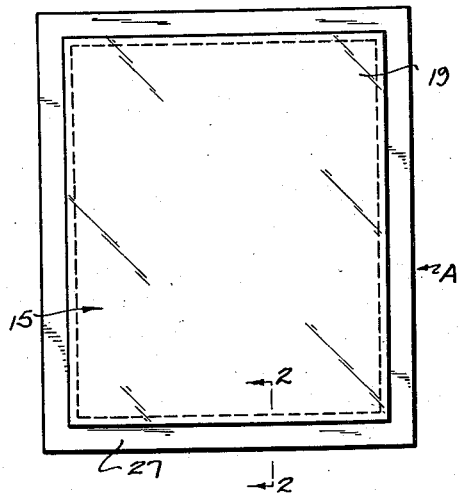
Fig. 1 is a face view of a multiple glazing unit made in accordance with this invention.
Figure 2:
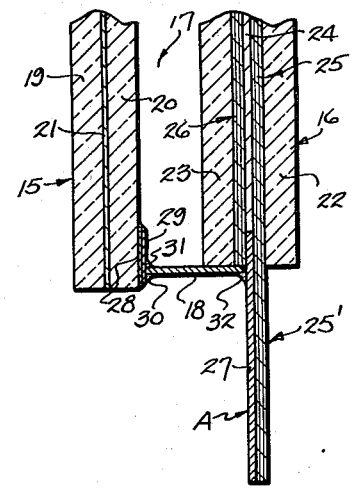
Fig. 2 is a transverse section therethrough taken on line 2—2 of Fig. 1.

With reference now to the drawings and particularly to Figs. 1 to 5 inclusive, the multiple glazing unit consists generally of the two transparent panels 15 and 16 equidistantly spaced from one another throughout their entire areas to provide an insulating space 17 therebetween. Broadly stated, the insulating space 17 is formed by the use of metal separator means 18 arranged between the panels 15 and 16 around the edges thereof and secured thereto in a manner to be more fully hereinafter described.

Although the transparent panel 15 may consist of a single sheet or plate of glass, it is shown as comprising a sheet of laminated safety glass including the two sheets of glass 19 and 20 bonded to one another by an interposed adherent layer of thermoplastic 21. The transparent panel 16 also comprises a sheet of laminated safety glass including the two sheets of glass 22 and 23 having interposed therebetween a plastic interlayer composed of a central sheet or core 24 faced on opposite sides with the two plastic membranes 25 and 26 bonded to the central sheet 24 and also to the glass sheets 22 and 23 respectively to provide a unitary structure.

The glass sheets 22 and 23 may consist of ordinary plate or window glass and may be either fully tempered or semi-tempered or any desired combination of glass sheets may be used. This is also true of the glass sheets 19 and 20 of transparent panel 15. Each of the plastic membranes 25 and 26 of transparent panel 16 may consist of a single sheet, layer or film of thermoplastic of the desired thickness or it may be built up of a plurality of relatively thin sheets, layers or films to give the required thickness. By way of example, each plastic membrane 25 and 26 may be made up of three relatively thin sheets of thermoplastic, with each individual sheet being approximately .015 of an inch thick. When the thin sheets of plastic forming the membranes 25 and 26 are bonded to one another and to the central sheet 24 there will of course be provided a thermoplastic interlayer of laminated or multi-ply structure.

The plastic sheets forming the interlayer may be formed of a polyvinyl acetal resin and one such resin which has been used is polyvinyl butyr acetal resin plasticized with 37½ parts dibutyl sebacate per 100 parts of resin by weight. However, different plastics varying in thickness and physical characteristics may be employed as the invention is not limited to the use of any particular resin, class of resins, cellulosic derivatives or the like.

Carried by the plastic interlayer of transparent panel 16 at each edge thereof is a relatively thin flexible metal member 27 which projects outwardly beyond the respective edges of the glass sheets 22 and 23. As shown, the flexible metal members 27 have their inner marginal edge portions received between the two glass sheets 22 and 23 and bonded thereto by the plastic membranes 25 and 26. While the distance the metal members 27 extend inwardly of the glass edges may vary, for the average size light or pane a distance of approximately ¼ inch has been found satisfactory.

The metal members 27 may be of steel, tin, aluminum, galvanized metal or the like, and the thickness thereof may be varied. By way of example, it may be mentioned that when using aluminum, a thickness of approximately .020 to .030 of an inch is satisfactory. An individual metal strip may be arranged at each edge of the panel 16 and left disconnected at their adjacent ends or the adjacent ends thereof may be welded, soldered or otherwise suitably secured together to form an integral collar. Also, a single one-piece frame may be cut from a sheet of the desired metal.

It will be noted that the area of the plastic membrane 26 is substantially the same as the area of the glass sheets 22 and 23, while the area of the plastic membrane 25 is relatively greater than that of the glass sheets so that it projects outwardly beyond the edges of said sheets, as indicated at 25', and covers the outer faces of the metal strips 27 to provide a combined metal-plastic attaching flange A.

The separator means 18 for the transparent panels 15 and 16 comprises metal strips secured along one edge to the panel 15 through the intermediary of the metallic coatings 28 and 29 applied to the glass sheet 20 and along the opposite edge to the flexible metal members 27 carried by panel 16. The metallic coatings 28 may be produced from pure copper or an alloy of copper or other solderable metal or metal alloy and may be applied to the glass in any desired manner such as by spraying the molten metal thereon with a metallizing gun. The metallic coating 29 consists of a relatively thin layer of solder applied to the coating 28 and which aids in securing the metal separator strips 18 to said metallic coating 28. The separator strips 18 may be of lead or other metal which can be readily soldered to the metallic coatings 28.

In order to prevent discoloration of the plastic interlayer 21 of panel 15 or weakening of the bond between the plastic and glass, it is preferred that if the metallic coating 28 is formed by spraying molten metal upon the glass, it be applied to the glass sheet 20 before said sheet is laminated with the glass sheet 19 and plastic interlayer 21. The layer of solder 29 may be applied to the metallic coating 28 either before or after the laminating of the glass sheets with the plastic interlayer, but if applied before laminating will serve to protect the metallic coating 28.

In fabricating the glazing unit, the metal separator strips 18 are first associated with the transparent panel 15 and joined to the metallic coating 28 by solder fillets 30 and 31 which may be formed by the usual method of running an ordinary solder joint along the inner and outer sides of the separator strips. More particularly, this is done by drawing a hot iron along the edge of the separator strips and at the same time applying the desired amount of solder. The solder will not only adhere to the separator strips but will likewise fuse or amalgamate with the layer of solder 29 on metallic coating 28 to form a strong, tight connection between the separator strips and glass sheet 20. The transparent panel 15 and separator means 18 are then assembled with transparent panel 16 in the manner shown in Fig. 4. That is to say, panel 16 is first supported horizontally with the flexible metal members 27 facing upwardly. The metal frame formed by the separator strips 18 is then slipped over the edges of the inner glass sheet 23 of panel 16 and secured to the flexible metal members 27 by a solder fillet 32 using a hot iron 33 or in any other desired manner.

When mounting the glazing unit above described, it is secured within the opening to be glazed by clamping the flexible metal-plastic attaching flange A only in a frame or to a support as distinguished from clamping the marginal edge portions of the transparent panels 15 and 16, thereby giving to the mounting a certain flexibility or resiliency so that any twisting or weaving of the plane will be taken up by the metal-plastic attaching flange instead of being transmitted directly to the laminated glass panels.

Figure 3:
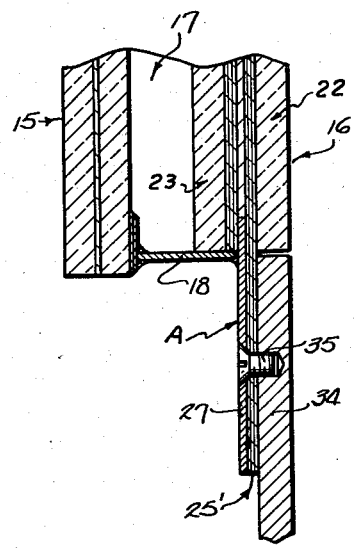
Fig. 3 is a similar transverse section through the unit showing the mounting thereof.
Figure 4:
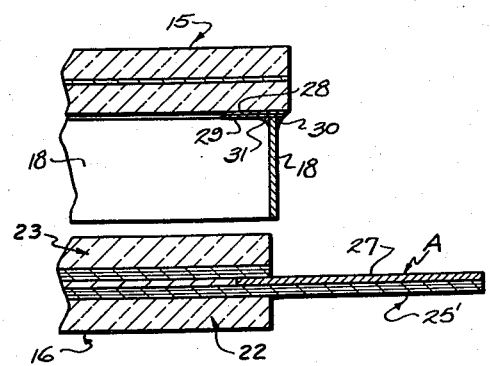
Fig. 4 is a transverse section showing the way in which the two transparent panels are assembled with one another.
Figure 5:
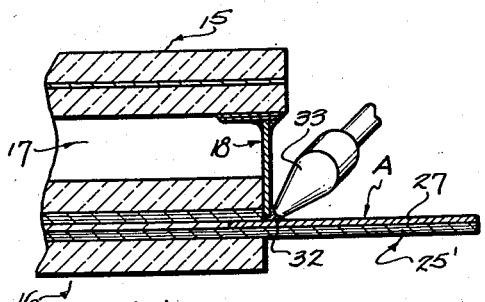
Fig. 5 is a similar view showing the securing of the transparent panels together.
Figure 6:
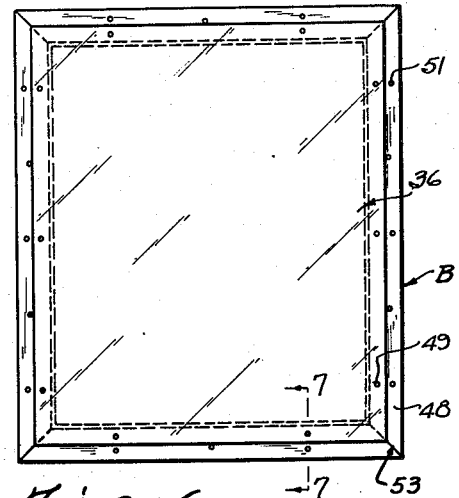
Fig. 6 is a face view of a modified form of multiple glazing unit also constructed in accordance with the invention.
Figure 7:
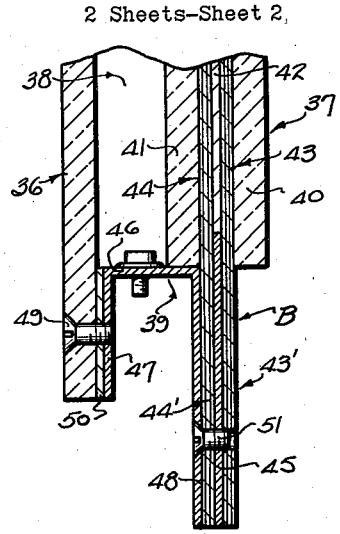
Fig. 7 is a transverse section taken on line 7—7 of Fig. 6.
Figure 8:
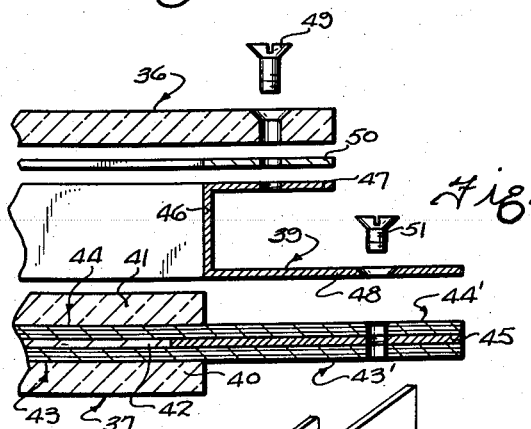
Fig. 8 is an exploded view showing the various parts of the glazing unit properly associated with one another prior to joining.

By way of example, the glazing unit is shown in Fig. 3 as being secured within a frame 34 by screws, bolts, or other suitable fastening elements 35. The frame 34 may constitute a part of any window or windshield construction but will be herein referred to as forming part of the skin of an airplane. As shown, the screws (or bolts) 35 pass through the flexible metal members 27 and extended plastic 25' into the skin 34 of the plane to positively anchor the glazing unit in position. The supporting frame for the unit may take a variety of different forms and therefore the invention is in no way limited to the construction of the frame within which the glazing unit is mounted or just how the attaching flange A might be secured therein. As illustrated in Fig. 3, a relatively small space or gap is left between the peripheral edges of the outer glass sheet 22 of transparent panel 16 and the inner edges of the frame 34 to permit the desired freedom of movement of the glazing unit relative to the frame without binding.

Since the flexible metal-plastic attaching flange A only is clamped in the frame 34, it will be apparent that the glazing unit will be permitted a certain amount of floating movement to and fro in the opening due to the resiliency or yieldability of the metal and plastic. Because of this, the liability of breaking or shattering of the glass resulting from a weaving and twisting of the ship proper will be minimized. Also, because of the flexibility or yieldability of the attaching flange A, the glazing unit can be readily accommodated to certain irregularities in the supporting frame as well as to irregularities in the glazing unit itself at time of installation without placing any undue strain upon the glass. The glazing unit herein provided can be readily and quickly mounted within the frame or removed therefrom for replacement and, in addition, the use of heavy or bulky fasteners or holders for mounting the unit is avoided. In some cases, it may be found desirable to use sheets of relatively hard plastic in place of the glass sheets.

By extending the plastic membrane 25 beyond the edges of the glass sheets 22 and 23 to cover the outer faces of the metal members 27 and in bonding the extended plastic to said metal members, it is possible to obtain those advantages resulting from both the flexibility and strength of the metal as well as the cushioning effect of the plastic which is disposed between the metal and frame 34. Thus, the plastic coating on the metal serves as a gasket material when mounted and also gives protection to the bond between the metal and plastic. Furthermore, the combining of the metal members 27 with the extended plastic serves to uniformly distribute the weight of the glazing unit as well as the strain placed thereon and to minimize tearing or deformation of the extended portion of the plastic. The use of the metal members with the extended plastic is also of importance in that the metal does not fatigue or elongate when subjected to alternate waves of pressure.

Another important feature of this type of glazing unit and mounting therefor is that there is provided a so-called "flush" type of installation which is of particular advantage when used in airplanes. Thus, as shown in Fig. 3, the outer surface of the outer glass sheet 22 of transparent panel 16 is flush with the outer surface of the skin 34 of the plane so as not to break the streamlined surfaces of the plane whereby wind resistance is materially reduced.

This type of glazing unit is also suitable for use in glazing stratosphere planes in which pressurized cabins or other compartments are provided to obviate the necessity for each occupant of the plane having an individual oxygen supply. When the unit is glazed in a stratosphere plane where a difference in pressure exists between one side and the other of the unit, the said unit will be permitted to move freely inwardly or outwardly relative to the supporting frame depending upon the differential in pressure.

In Figs. 6 to 10 is illustrated a modified type of multiple glazing unit embodying all of the principal features of this invention. In this form of the invention, the glazing unit comprises the two transparent panels 36 and 37 spaced from one another to provide an insulating space 38 therebetween and secured together around their edges by the metal separator means 39. The transparent panel 36 consists of a single sheet or plate of glass or a sheet of relatively hard transparent plastic. The transparent panel 37 consists of a sheet of laminated safety glass comprising the two sheets of glass 40 and 41 having interposed therebetween a plastic interlayer composed of a central sheet or core 42 faced on opposite sides with the plastic membranes 43 and 44 bonded to the central sheet 42 and to the glass sheets 40 and 41 respectively. In this type of unit, both plastic membranes 43 and 44 extend beyond the edges of the glass sheets 40 and 41 and cover both faces of the flexible metal strips 45 to form a laminated metal-plastic attaching flange B. The separator means 39 comprises a metal channel member (Fig. 10) arranged at each edge of the unit and comprising a flat base portion 46 and the two outwardly projecting legs 47 and 48; the leg 48 being relatively longer than leg 47.

Figure 9:
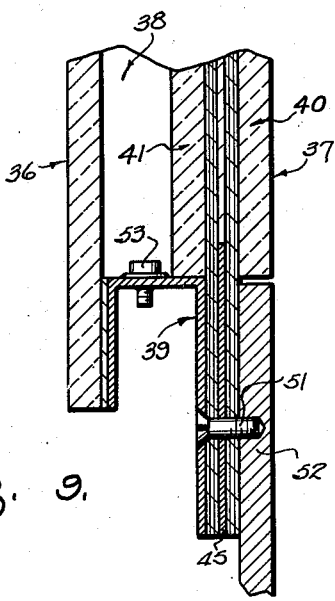
Fig. 9 is a transverse section through the unit and mounting therefor.
Figure 10:
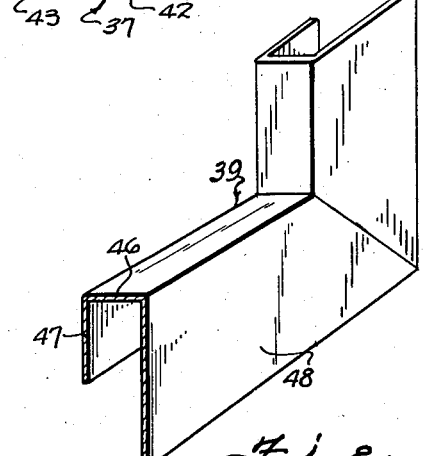
Fig. 10 is a perspective sectional view of the separator means for the two transparent panels.

In securing the panels 36 and 37 together, the legs 47 of the metal separators are disposed opposite the inner face of the panel 36 and secured thereto by screws or the like 49; a strip of plastic 50 being preferably interposed between the metal and glass. The base portions 46 of the channel members engage the peripheral edges of the inner glass sheet 41 of panel 37, while the legs 48 engage the inner surface of the attaching flange A and are secured thereto by screws or the like 51. The adjacent ends of the metal channel members are mitered as at 53 and may be left disconnected or secured together as preferred. The separator means 39 may be formed of the same metal as the metal members 45. In Fig. 9, the unit is shown as being associated with the skin 52 of an airplane and the screws 51 may be sufficiently long to extend entirely through the attaching flange A and into the skin of the ship or separate screws may be provided for this purpose.

If desired, the air within the space 38 between the two panels 36 and 37 may be removed to create a vacuum therein or dehydrated air may be introduced into said space. For this purpose there may be provided in one or more of the metal separator members 39 a valve 53.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A multiple glazing unit, comprising a pair of transparent panels arranged in face to face relation and spaced from one another, a flexible metal member carried by one of said panels and projecting outwardly beyond the edges thereof to provide an attaching flange, a metallic coating on the other panel, and metal separator means arranged between the panels at the edges thereof and being soldered to the flexible metal member of the one panel and to the metallic coating on the other panel.

2. A multiple glazing unit, comprising a pair of transparent panels arranged in face to face relation and spaced from one another, one of said panels including a plurality of laminations secured together, a flexible metal member permanently carried by one of the laminations of said panel and projecting outwardly beyond the edges of adjacent laminations to provide an attaching flange, and metal separator means arranged between the panels at the edges thereof and being soldered to the flexible metal member of the one panel and soldered directly to the other panel.

3. A multiple glazing unit, comprising a pair of transparent panels arranged in face to face relation and spaced from one another, one of said panels including two outer sheets of a relatively hard material and an inner sheet of thermoplastic bonded to said outer sheets, a flexible metal member carried by and forming an integral part of the thermoplastic sheet of said panel and projecting outwardly beyond the edges of said outer sheets to provide an attaching flange, a metallic coating on the other panel, and metal separator means arranged between the panels at the edges thereof and being soldered to the flexible metal member of the one panel and to the coating on the other panel.

4. A multiple glazing unit, comprising a pair of transparent panels arranged in face to face relation and spaced from one another, one of said panels comprising two sheets of glass and an interposed layer of thermoplastic adherent thereto, a flexible metal member permanently carried by the plastic interlayer of said panel and having a portion projecting outwardly beyond the edges of the glass sheets to provide an attaching flange, and metal separator means arranged between the panels around the edges thereof and being soldered to the projecting portion of the flexible metal member of the one panel and soldered directly to the other panel.

5. A multiple glazing unit, comprising a pair of transparent panels arranged in face to face relation and spaced from one another, one of said panels comprising two sheets of glass and an interposed layer of thermoplastic adherent thereto, a flexible metal member permanently carried by the plastic interlayer of said panel and having a portion thereof received between the glass sheets and another portion projecting outwardly beyond the edges of said sheets to provide an attaching flange, and metal separator means arranged between the panels around the edges thereof and being soldered to the projecting portion of the flexible metal member of the one panel and soldered directly to the other panel.

6. A multiple glazing unit, comprising a pair of transparent panels arranged in face to face relation and spaced from one another, one of said panels comprising two sheets of glass and an interposed layer of thermoplastic adherent thereto, a flexible metal member permanently carried by the plastic interlayer of said panel and having a portion thereof received between the glass sheets and another portion projecting outwardly beyond the edges of said sheets to provide an attaching flange, said plastic interlayer also extending beyond the edges of the glass sheets and covering the outer surface of said flexible metal member, and metal separator means arranged between the panels around the edges thereof and being soldered to the outwardly projecting portion of the flexible metal member of the one panel and soldered directly to the other panel.

7. A multiple glazing unit, comprising a pair of transparent panels arranged in face to face relation and spaced from one another; one of said panels comprising two sheets of glass and an interposed layer of thermoplastic adherent thereto, a flexible metal member permanently carried by the plastic interlayer of said panel and having a portion projecting outwardly beyond the edges of the glass sheets to provide an attaching flange, said plastic interlayer also extending beyond the edges of the glass sheets and covering the outer surface only of said flexible metal member, and metal separator means arranged between the panels around the edges thereof and being soldered to the flexible metal member of the one panel and soldered directly to the other panel.

8. A multiple glazing unit, comprising a pair of transparent panels arranged in face to face relation and spaced from one another, the area of one of said panels being relatively greater than the other so that said first-mentioned panel extends outwardly beyond the edges of said second-mentioned panel, a metallic coating on one face of the first-mentioned panel, a flexible metal member carried by the second-mentioned panel and extending outwardly beyond the edges thereof to provide an attaching flange, and metal separator means arranged between the panels at the edges thereof and being soldered to the flexible metal member of said second-mentioned panel and soldered to the metallic coating on the face of said first-mentioned panel.

GEORGE B. WATKINS.